US011886998B2

(12) United States Patent
Shazeer et al.

(10) Patent No.: US 11,886,998 B2
(45) Date of Patent: Jan. 30, 2024

(54) ATTENTION-BASED DECODER-ONLY SEQUENCE TRANSDUCTION NEURAL NETWORKS

(71) Applicant: Google LLC, Mountain View, CA (US)

(72) Inventors: Noam M. Shazeer, Palo Alto, CA (US); Lukasz Mieczyslaw Kaiser, San Francisco, CA (US); Etienne Pot, Palo Alto, CA (US); Mohammad Saleh, Santa Clara, CA (US); Ben Goodrich, San Francisco, CA (US); Peter J. Liu, Santa Clara, CA (US); Ryan Sepassi, Beverly Hills, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/096,946

(22) Filed: Jan. 13, 2023

(65) Prior Publication Data

US 2023/0153613 A1    May 18, 2023

Related U.S. Application Data

(63) Continuation of application No. 16/759,690, filed as application No. PCT/US2018/058025 on Oct. 29, 2018, now Pat. No. 11,556,786.

(60) Provisional application No. 62/578,358, filed on Oct. 27, 2017.

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ............ G06N 3/08; G06N 3/045; G06N 3/04; G06N 3/0445; G06N 3/10
See application file for complete search history.

(56) References Cited

U.S. PATENT DOCUMENTS

| 8,705,805 | B2* | 4/2014 | Forrest | B42D 15/00 356/30 |
| 2018/0114108 | A1* | 4/2018 | Lao | G06N 3/044 |
| 2019/0149834 | A1* | 5/2019 | Zhou | H04N 19/187 348/473 |
| 2021/0089829 | A1* | 3/2021 | Rae | G06N 3/047 |

OTHER PUBLICATIONS

Ba et al., "Layer normalization", arXiv:1607.06450v1, Jul. 2016, 14 pages.

(Continued)

*Primary Examiner* — John J Lee
(74) *Attorney, Agent, or Firm* — Fish & Richardson P.C.

(57) ABSTRACT

Methods, systems, and apparatus, including computer programs encoded on a computer storage medium, for generating an output sequence from an input sequence. One of the methods includes, at each of a plurality of generation time steps: generating a combined sequence for the generation time step that includes the input sequence followed by the output tokens that have already been generated as of the generation time step; processing the combined sequence using a self-attention decoder neural network to generate a time step output that defines a score distribution over a set of possible output tokens; and selecting, using the time step output, an output token from the set of possible output tokens as the next output token in the output sequence.

20 Claims, 4 Drawing Sheets

(56) References Cited

OTHER PUBLICATIONS

Bahdanau et al., "Neural Machine Translation by Jointly Learning to Align and Translate", arXiv: 1409.0473v7, May 2016, 15 pages.
Britz et al., "Massive Exploration of Neural Machine Translation Architectures", arXiv: 1703.03906v2, Mar. 2017, 9 pages.
Cheng et al., "Long short-term memory-networks for machine reading", arXiv: 1601.06733v7, Sep. 2016, 11 pages.
Cho et al., "Learning phrase representations using RNN encoder-decoder for statistical machine translation", arXiv: 1406.1078v3, Sep. 2014, 15 pages.
Chollet, "Xception: Deep learning with depthwise separable convolutions", Proceedings of the IEEE Conference on Computer Vision and Pattern Recognition, 2017, pp. 1251-1258.
Chopra et al., "Abstractive Sentence Summarization with Attentive Recurrent Neural Networks", Proceedings of the 2016 Conference of the North American Chapter of the Association for Computational Linguistics: Human Language Technologies, 2016, pp. 93-98.
Chung et al., "Empirical evaluation of gated recurrent neural networks on sequence modeling", arXiv:1412.3555v1, Dec. 2014, 9 pages.
Dyer et al., "Recurrent neural network grammars", arXiv: 1602.07776v4, Oct. 2016, 13 pages.
Gehring et al., "Convolutional sequence to sequence learning", arXiv:1705.03122v3, Jul. 2017, 15 pages.
Graff et al., "English gigaword", Linguistic Data Consortium, 2003, 4(1): 34.
Graves, "Generating sequences with recurrent neural networks", arXiv:1308.0850v5, Jun. 2014, 43 pages.
He et al., "Deep residual learning for image recognition", Proceedings of the IEEE Conference on Computer Vision and Pattern Recognition, 2016, pp. 770-778.
Hewlett et al., "Wikireading: A novel large-scale language understanding task over wikipedia", arXiv:1608.03542v2, Mar. 2017, 11 pages.
Hochreiter et al., "Gradient flow in recurrent nets: the difficulty of learning long term dependencies", 2001, 15 pages.
Hochreiter et al., "Long short-term memory", Neural Computation, 1997, 9(8):1735-1780.
Huang et al., "Self-training PCFG grammars with latent annotations across languages", Proceedings of the 2009 Conference on Empirical Methods in Natural Language Processing, Aug. 2009, pp. 832-841.
International Preliminary Report on Patentability in International Appln. PCT/US2018/058025, dated May 5, 2020, 11 pages.
International Search Report and Written Opinion in International Appln. PCT/US2018/058025, dated Feb. 12, 2019, 17 pages.
Josefowicz et al., "Exploring the limits of language modeling", arXiv:1602.02410v2, Feb. 2016, 11 pages.
Kaiser et al., "Can active memory replace attention", Advances in Neural Information Processing Systems, 2016, 9 pages.
Kaiser et al., "Depthwise Separable Convolutions for Neural Machine Translation", arXiv:1706.03059, Jun. 2017, 10 pages.
Kaiser et al., "Neural GPU's learn algorithms", arXiv:1511.08228v3, Mar. 2016, 9 pages.
Kalchbrenner et al., "Neural Machine Translation in Linear Time", arXiv:1610.10099v2, Mar. 2017, 9 pages.
Kim et al., "Structured attention networks", International Conference on Learning Representations, 2017, 21 pages.
Kingma et al., "Adam: A method for stochastic optimization", arXiv:1412.6980v9, Jan. 2017, 15 pages.
Kuchaiev et al., "Factorization tricks for LSTM networks", arXiv: 1703.10722v3, Feb. 2018, 6 pages.
Lebret et al., "Neural text generation from structured data with application to the biography domain", Proceedings of the 2016 Conference on Empirical Methods in Natural Language Processing, 2016, pp. 1203-1213.

Lehmann et al., "Dbpedia—A large scale, multilingual knowledge base extracted from Wikipedia", Semantic Web, 2015, 6(2):167-195.
Lin et al., "A structured self-attentive sentence embedding", arXiv:1703.03130v1, Mar. 2017, 15 pages.
Lin, "Rouge: A package for automatic evaluation of summaries" Text summarization branches out: Proceedings of the ACL-04 workshop, 2004, 8:8.
Liu et al., "Generating Wikipedia by Summarizing Long Sequences" arXiv: 1801.10198v1, Jan. 2018, 18 pages.
Luong et al., "Effective approaches to attention based neural machine translation", arXiv:1508.04025v5, Sep. 2015, 11 pages.
Marcus et al., "Building a large annotated corpus of english: the penn treebank", Computational Linguistics, 1993, 19(2):313-330.
McClosky et al., "Effective self-training for parsing", Proceedings of the Human Language Technology Conference of the NAACL, Main Conference, Jun. 2006, pp. 152-159.
Nallapati et al., "Abstractive Text Summarization using sequence to sequence RNNs and Beyong", arXiv: 1602.06023v5, Aug. 2016, 12 pages.
Parikh et al., "A decomposable attention model", Empirical Methods in Natural Language Processing, 2016, 7 pages.
Paulus et al., "A deep reinforced model for abstractive summarization", arXiv: 1705.04304v3, Nov. 2017, 12 pages.
Petrov et al., "Learning accurate, compact, and interpretable tree annotation", Proceedings of the 21st International Conference on Computational Linguistics and 44th Annual Meeting of the ACL, Jul. 2006, pp. 433-440.
Press et al., "Using the output embedding to improve language models", arXiv:1608.05859v3, Feb. 2017, 7 pages.
Rajpurkar et al., "SQuAD: 100,000+ Questions for Machine Comprehension of Text", arXiv: 1606.05250v3, Oct. 2016, 10 pages.
Ramos et al., "Using TF-IDF to determine word relevance in document queries", Proceedings of the first instructional conference on machine learning, 2003, 242:133-142.
Rush et al., "A nerual attention model for abstractive sentence summarization", Proceedings of the 2015 Conference on Empirical Methods in Natural Language Processing, 2015, pp. 379-389.
Sauper et al., "Automatically Generating Wikipedia Articles: A structure-aware approach", Proceedings of the Joint Conference of the 47th Annual Meeting of the ACL and the 4th International Joint Conference on Natural Language Processing of the AFNLP: vol. 1—vol. 1, 2009, pp. 208-216.
Sennrich et al., "Neural Machine Translation of Rare Words with Subword Units", arXiv:1508.07909v5, Jun. 2016, 11 pages.
Shazeer et al., "Outrageously large neural networks: The sparsely-gated mixture of experts layer", arXiv: 1701.06538v1, Jan. 2017, 19 pages.
Srivastava et al., "Dropout: A simple way to prevent neural networks from overfitting", Journal of Machine Learning Research, 2014, 15:1929-1958.
Sutskever et al., "Sequence to sequence learning with neural networks", Advances in Neural Information Processing Systems, 2014, pp. 3104-3112.
Szegedy et al., "Rethinking the inception architecture for Computer Vision", Proceedings of the IEEE Conference on Computer Vision and Pattern Recognition, 2016, pp. 2818-2826.
Vaswani et al., "Attention is all you need", Advances in Neural Information Processing Systems, 2017, 11 pages.
Vinyals et al., "Grammar as a foreign language", Advances in Neural Information Processing Systems, 2015, 9 pages.
Wu et al., "Googles neural machine translation system: Bridging the gap between human and machine translation", arXiv:1609.08144v2, Oct. 2016, 23 pages.
Zhou et al., "Deep recurrent models with fast-forward connections for neural machine translation", Transactions of the Association for Computational Linguistics, 2016, 4:371-383.
Zhu et al., "Fast and Accurate Shift-Reduce Constituent Parsing", Proceedings of the 51st Annual Meeting of the ACL (vol. 1: Long Papers), Aug. 2013, pp. 434-443.

* cited by examiner

ATTENTION-BASED DECODER-ONLY SEQUENCE TRANSDUCTION NEURAL NETWORKS

CROSS-REFERENCE TO RELATED APPLICATION

This patent application is a continuation (and claims the benefit of priority under 35 USC 120) of U.S. patent application Ser. No. 16/759,690, filed Apr. 27, 2020, which is a U.S. National Phase Application under U.S.C. § 371 of International Application No. PCT/US2018/058025, filed Oct. 29, 2018, which claims the benefit of priority under 35 U.S.C. 119 to U.S. Patent Application Ser. No. 62/578,358, filed on Oct. 27, 2017, the entire contents of which are hereby incorporated by reference.

BACKGROUND

This specification relates to transducing sequences using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that generates an output sequence that includes a respective output at each of multiple positions in an output order from an input sequence that includes a respective input at each of multiple positions in an input order, i.e., transduces the input sequence into the output sequence. In particular, the system generates the output sequence using a decoder neural network that is self-attention-based.

Particular embodiments of the subject matter described in this specification can be implemented so as to realize one or more of the following advantages.

The decoder-only architecture of the system described in this specification can effectively and scalably attend to very long sequences, much longer than conventional sequence transduction systems. Thus, the system can more effectively perform sequence transduction tasks that require processing long input sequences, generating long output sequences, or both. For example, the system may outperform conventional systems on an expressive summarization task that requires generating a long summary of multiple documents. Such tasks and other long sequence transduction tasks may require processing and extracting information from an input sequence that includes 10,000 or more tokens to effective generate an output sequence. However, because the system is entirely or mostly attention-based, the system is nonetheless as computationally-efficient or, in many cases, more computationally-efficient than existing techniques.

Additionally, because the described system uses only a decoder neural network and does not require a separate encoder network, the number of parameters and, therefore, the memory consumed by storing and running inference using the neural network are greatly reduced relative to other networks that are capable of performing well on sequence transduction tasks.

Moreover, by making use of local attention, memory-compressed attention, or both as described in this specification, the described systems are able to efficiently perform sequence transduction on very long sequences without consuming an excessive amount of computational resources.

More generally, the described system is also advantageous over many existing systems because of the use of self-attention. Many existing approaches to sequence transduction using neural networks use recurrent neural networks in both the encoder and the decoder. While these kinds of networks can achieve good performance on sequence transduction tasks, their computation is sequential in nature, i.e., a recurrent neural network generates an output at a current time step conditioned on the hidden state of the recurrent neural network at the preceding time step. This sequential nature precludes parallelization, resulting in long training and inference times and, accordingly, workloads that utilize a large amount of computational resources.

On the other hand, because decoder of the described system is attention-based, the system can transduce sequences quicker, be trained faster, or both, because the operation of the network can be more easily parallelized. That is, because the described neural network relies entirely on an attention mechanism to draw global dependencies between input and output and does not employ any recurrent neural network layers, the problems with long training and inference times and high resource usage caused by the sequential nature of recurrent neural network layers are mitigated.

Moreover, the described neural network can transduce sequences more accurately than existing networks that are based on convolutional layers or recurrent layers, even though training and inference times are shorter. In particular, in conventional models, the number of operations required to relate signals from two arbitrary input or output positions grows with the distance between positions, e.g., either linearly or logarithmically depending on the model architecture. This makes it more difficult to learn dependencies between distant positions during training. In the presently described neural network, this number of operations is reduced to a constant number of operations because of the use of attention (and, in particular, self-attention) while not relying on recurrence or convolutions. Self-attention, sometimes called intra-attention, is an attention mechanism relating different positions of a single sequence in order to compute a representation of the sequence. The use of attention mechanisms allows the neural network to effectively learn dependencies between distant positions during training, improving the accuracy of the neural network on various transduction tasks, e.g., machine translation. The described neural network can also exhibit improved performance over conventional sequence transduction neural networks without task-specific tuning through the use of the attention mechanism.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that generates a target sequence that includes a respective output at each of multiple positions in an output order from an input sequence that includes a respective input at each of multiple positions in an input order, i.e., transduces the input sequence into the target sequence.

For example, the system may be a neural machine translation system. That is, if the input sequence is a sequence of words in an original language, e.g., a sentence or phrase, the target sequence may be a translation of the input sequence into a target language, i.e., a sequence of words in the target language that represents the sequence of words in the original language.

As another example, the system may be a speech recognition system. That is, if the input sequence is a sequence of audio data representing a spoken utterance, the target sequence may be a sequence of graphemes, characters, or words that represents the utterance, i.e., is a transcription of the input sequence.

As another example, the system may be a natural language processing system. For example, if the input sequence is a sequence of words in an original language, e.g., a sentence or phrase, the target sequence may be a summary of the input sequence in the original language, i.e., a sequence that has fewer words than the input sequence but that retains the essential meaning of the input sequence. As another example, if the input sequence is a sequence of words that form a question, the target sequence can be a sequence of words that form an answer to the question.

As another example, the system may be part of a computer-assisted medical diagnosis system. For example, the input sequence can be a sequence of data from an electronic medical record and the target sequence can be a sequence of predicted treatments.

As another example, the system may be part of an image processing system. For example, the input sequence can be an image, i.e., a sequence of color values from the image, and the output can be a sequence of text that describes the image. As another example, the input sequence can be a sequence of text or a different context and the output sequence can be an image that describes the context.

As another example, the system may be part of an extractive summarization system. In particular, the input sequence can be text from multiple input documents and, optionally, a topic of the documents, and the output sequence can be a text summary of the input documents.

In particular, the neural network is a self-attention-based decoder neural network. In some cases, the decoder does not include any convolutional layers or any recurrent layers.

Figure 1:
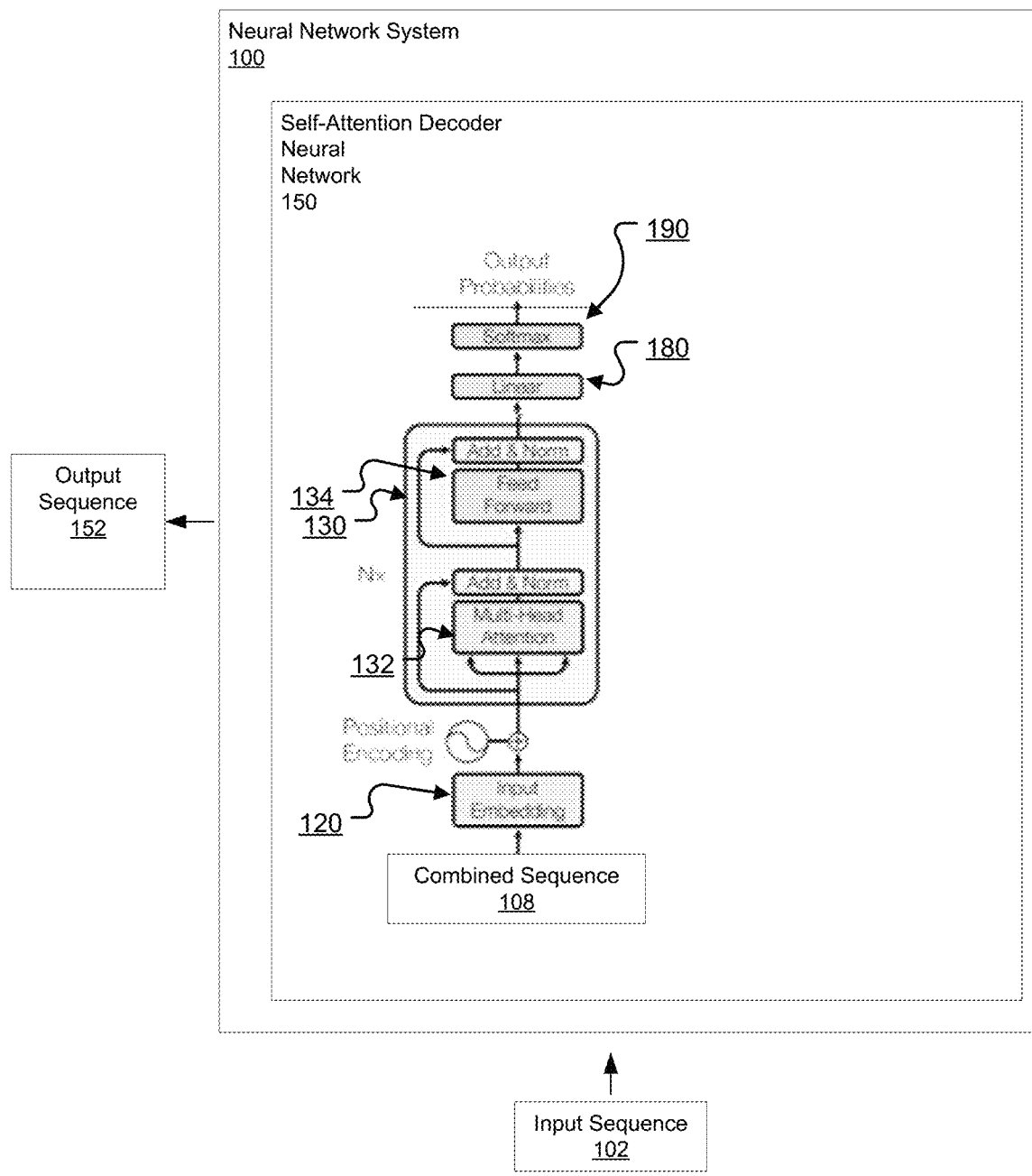
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 receives an input sequence 102 and processes the input sequence 102 to transduce the input sequence 102 into an output sequence 152.

The input sequence 102 has a respective input token at each of multiple input positions in an input order and the output sequence 152 has a respective output token at each of multiple output positions in an output order. That is, the input sequence 102 has multiple inputs arranged according to an input order and the output sequence 152 has multiple outputs arranged according to an output order.

As described above, the neural network system 100 can perform any of a variety of tasks that require processing sequential inputs to generate sequential outputs. In the particular example where the neural network system 100 performs expressive summarization, the input sequence can include text from a plurality of documents, and the output sequence can be text that summarizes the plurality of documents. Optionally, the input sequence can also include, e.g., at the beginning of the input sequence, a desired topic for the summary text, i.e., text specifying a topic to which the plurality of documents relate.

The neural network system 100 includes a self-attention decoder neural network 150. As will be described in more detail below, the self-attention decoder neural network 150 includes a plurality of neural network layers that include a plurality of masked self-attention neural network layers.

The decoder neural network 150 is configured to generate the output sequence in an auto-regressive manner.

That is, the decoder neural network 150 generates the output sequence output by output by generating an output token at a respective output position at each of a plurality of generation time steps. That is, at each generation time step, the decoder neural network 150 generates a new output token at the next output position in the output order conditioned on the input sequence and the output tokens at output positions preceding the next output position in the output order.

In particular, for a given output position, the decoder neural network 150 generates a time step output that defines a probability distribution over possible output tokens at the given output position.

The system 100 can then select a network output for the output position by sampling from the probability distribution or by selecting the output token with the highest probability.

More specifically, at each generation time step, the system 100 generates a combined sequence 108 for the generation time step.

The combined sequence 108 includes the input sequence followed by the output tokens that have already been generated as of the generation time step, i.e., the output tokens at preceding positions in the output order. In some implementations, the already generated output tokens immediately follow the input sequence tokens in the combined sequence 108. In some other implementations, the input sequence and the output tokens that have already been generated as of the generation time step are separated by a predetermined special separator token in the combined sequence 108.

In other words, the system 100 represents the input sequence and the already generated output jointly as a single combined sequence, removing the need to employ an encoder neural network during transduction of the input sequence.

The decoder neural network 150 then processes the combined sequence 108 to generate the output that defines the probability distribution over possible output tokens at the output position.

Because the decoder neural network 150 is auto-regressive, at each generation time step, the decoder 150 operates on the output tokens that have already been generated before the generation time step, i.e., the outputs at output positions preceding the corresponding output position in the output order. In some implementations, to ensure this is the case during both inference and training, at each generation time step the decoder neural network 150 shifts the already generated outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 150 operate on data at output positions preceding the given output positions (and not on data at any other output positions), it will be understood that this type of conditioning can be effectively implemented using the shifting described above.

The decoder neural network 150 includes an embedding layer 120, a sequence of one or more decoder subnetworks 130, a linear layer 180, and a softmax layer 190. In particular, as shown in FIG. 1, the decoder neural network includes N decoder subnetworks 130.

The embedding layer 120 is configured to, for each token in the combined sequence, map the token to a numeric representation of the token in an embedding space, e.g., into a vector in the embedding space. The embedding layer 120 then provides the numeric representations of the tokens to the first subnetwork in the sequence of decoder subnetworks 130, i.e., to the first decoder subnetwork 130 of the N decoder subnetworks 130.

In particular, in some implementations, the embedding layer 120 is configured to map each token to an embedded representation of the network input and then combine, e.g., sum or average or concatenate, the embedded representation of the token with a positional embedding of the position of the token in the combined sequence to generate a combined embedded representation of the token. That is, each position in the combined sequence has a corresponding embedding and for each token the embedding layer 120 combines the embedded representation of the token with the embedding of the token's position in the combined sequence.

In some cases, the positional embeddings are learned. As used in this specification, the term "learned" means that an operation or a value has been adjusted during the training of the decoder neural network 150. Training the decoder neural network 150 is described below with reference to FIG. 3.

In some other cases, the positional embeddings are fixed and are different for each position. For example, the embeddings can be made up of sine and cosine functions of different frequencies and can satisfy:

$$PE_{(pos,2i)}=\sin(pos/10000^{2i/d_{model}})$$

$$PE_{(pos,2i+1)}=\cos(pos/10000^{2i/d_{model}}),$$

where pos is the position, i is the dimension within the positional embedding, and $d_{model}$ is the dimensionality of the positional embedding (and of the other vectors processed by the neural network 150).

The combined embedded representation is then used as the numeric representation of the token.

Each of the decoder subnetworks 130 is configured to receive a respective decoder subnetwork input for each of the plurality of combined sequence positions and to generate a respective subnetwork output for each of the plurality of combined sequence positions.

The decoder subnetwork outputs generated by the last decoder subnetwork in the sequence are then provided as input to the linear layer 180.

For the first decoder subnetwork in the sequence, the decoder subnetwork input is the numeric representations generated by the embedding layer 120, and, for each decoder subnetwork other than the first decoder subnetwork in the sequence, the decoder subnetwork input is the decoder subnetwork output of the preceding decoder subnetwork in the sequence.

Each decoder subnetwork 130 includes a decoder masked self-attention sub-layer 132. The decoder self-attention sub-layer 132 is configured to, at each generation time step, receive an input for each combined sequence position preceding the corresponding output position, i.e., preceding the output position for which the output token is currently being generated and, for each of the particular combined sequence positions, apply an attention mechanism over the inputs at the combined sequence positions preceding the corresponding position using one or more queries derived from the input at the particular output position to generate a updated representation for the particular output position.

That is, the decoder self-attention sub-layer 172 applies an attention mechanism that is masked so that it does not attend over or otherwise process any data that is not at a position preceding the current output position in the combined sequence.

The masked attention mechanism and how the attention mechanism is applied by the decoder self-attention sub-layer 132 will be described in more detail below with reference to FIG. 2.

In some examples, different decoder self-attention sub-layers 132 in different decoder subnetworks 130 employ different attention mechanisms. For example, as will be described below with reference to FIGS. 2A and 2B, some self-attention sub-layers can employ local attention while others employ memory-compressed attention. In particular, in some implementations, the type of attention alternates between sub-networks, i.e., with every second subnetwork employing memory-compressed attention and the remainder of the subnetworks employing local attention.

In some implementations, each of the decoder subnetworks 130 also includes a residual connection layer that combines the outputs of the decoder self-attention sub-layer with the inputs to the decoder self-attention sub-layer to generate a decoder self-attention residual output and a layer normalization layer that applies layer normalization to the decoder self-attention residual output. These two layers are collectively referred to as an "Add & Norm" operation in FIG. 1.

Some or all of the decoder subnetworks can also include a position-wise feed-forward layer 134 that is configured to operate on each position in the combined sequence separately. In particular, for each combined sequence position, the feed-forward layer 134 is configured receive an input at the combined sequence position and apply a sequence of transformations to the input at the combined sequence position to generate an output for the combined sequence position. For example, the sequence of transformations can include two or more learned linear transformations each separated by an activation function, e.g., a non-linear elementwise activation function, e.g., a ReLU activation function. The inputs received by the position-wise feed-forward layer 134 can be the outputs of the layer normalization layer when the residual and layer normalization layers are included or the outputs of the decoder self-attention sub-layer 132 when the residual and layer normalization layers are not included. The transformations applied by the layer 134 will generally be the same for each input position (but different feed-forward layers in different sub-networks will apply different transformations).

In cases where a decoder subnetwork 130 includes a position-wise feed-forward layer 134, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation in FIG. 1. The outputs of this layer normalization layer can then be used as the outputs of the decoder subnetwork 130.

At each generation time step, the linear layer 180 applies a learned linear transformation to the output of the last decoder subnetwork 130 in order to project the output of the last decoder subnetwork 130 into the appropriate space for processing by the softmax layer 190. The softmax layer 190 then applies a softmax function over the outputs of the linear layer 180 to generate the probability distribution over the possible network outputs at the generation time step.

If the selected output token at a given generation time step is a pre-determined end-of-sequence token, the system 100 can determine that the output sequence 152 is complete and provide the output tokens that have already been generated as of the generation time step as the final output sequence 152 for the input sequence 102.

Thus, as can be seen from FIG. 1, rather than relying on an encoder neural network to first encode the input sequence and then generating the output sequence conditioned on the encoding of the input sequence as occurs in some conventional systems, the system 100 operates on the input sequence at each generation time step by way of the combined sequence. This use of the combined sequence allows the system 100 to effectively process long input sequences, i.e., because information from the entire input sequence is directly available at each generation time step, while still having fewer parameters than conventional systems, i.e., because the system 100 does not have an encoder neural network.

While not shown in FIG. 1, in some cases, to increase the computational capacity of the decoder neural network 150 without excessive increases in processing time or computational cost, the decoder neural network 150 can include one or more mixture of experts layers. At each time step, mixture of expert layers select a small subset of a large number of experts and combine outputs from the small subset of experts to generate the layer output for the time step. Mixture of experts layers are described in more detail in Noam Shazeer, Azalia Mirhoseini, Krzysztof Maziarz, Andy Davis, Quoc Le, Geoffrey Hinton, and Jeff Dean. Outrageously large neural networks: The sparsely-gated mixture-of-experts layer. arXiv preprint arXiv:1701.06538, 2017.

Figure 2A:
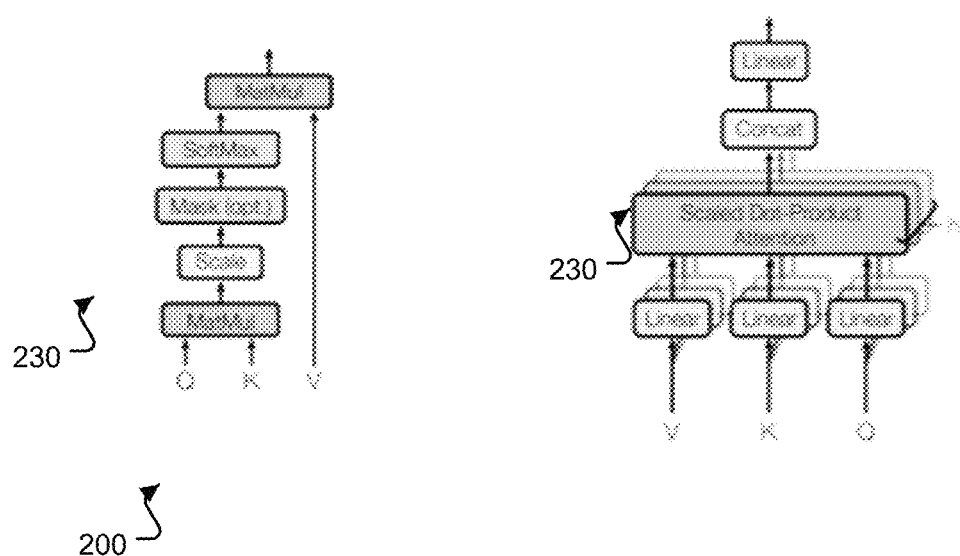
FIG. 2A is a diagram showing attention mechanisms that are applied by the attention sub-layers in the subnetworks of the decoder neural network.

FIG. 2A is a diagram 200 showing attention mechanisms that are applied by the attention sub-layers in the subnetworks of the decoder neural network 150.

Generally, an attention mechanism maps a query and a set of key-value pairs to an output, where the query, keys, and values are all vectors. The output is computed as a weighted sum of the values, where the weight assigned to each value is computed by a compatibility function of the query with the corresponding key.

More specifically, each attention sub-layer applies a scaled dot-product attention mechanism. In scaled dot-product attention, for a given query, the attention sub-layer computes the dot products of the query with all of the keys, divides each of the dot products by a scaling factor, e.g., by the square root of the dimensions of the queries and keys, and then applies a softmax function over the scaled dot products to obtain the weights on the values. The attention sub-layer then computes a weighted sum of the values in accordance with these weights. Thus, for scaled dot-product attention the compatibility function is the dot product and the output of the compatibility function is further scaled by the scaling factor.

In operation and as shown in the left hand side of FIG. 2, the attention sub-layer computes the attention over a set of queries simultaneously. In particular, the attention sub-layer packs the queries into a matrix Q, packs the keys into a matrix K, and packs the values into a matrix V. To pack a set of vectors into a matrix, the attention sub-layer can generate a matrix that includes the vectors as the rows of the matrix.

The attention sub-layer then performs a matrix multiply between the matrix Q and the transpose of the matrix K to generate a matrix of compatibility function outputs.

The attention sub-layer then scales the compatibility function output matrix, i.e., by dividing each element of the matrix by the scaling factor.

The attention sub-layer then applies a softmax over the scaled output matrix to generate a matrix of weights and performs a matrix multiply between the weight matrix and the matrix V to generate an output matrix that includes the output of the attention mechanism for each of the values.

Because the decoder attention sub-layers use masking, the attention sub-layer masks the scaled output matrix before applying the softmax. That is, the attention sub-layer masks out (sets to negative infinity), all values in the scaled output matrix that correspond to positions after the current output position.

In some implementations, to allow the attention sub-layers to jointly attend to information from different representation subspaces at different positions, the attention sub-layers employ multi-head attention, as illustrated on the right hand side of FIG. 2.

In particular, to implement multi-ahead attention, the attention sub-layer applies h different attention mechanisms in parallel. In other words, the attention sub-layer includes h different attention layers, with each attention layer within the same attention sub-layer receiving the same original queries Q, original keys K, and original values V.

Each attention layer is configured to transform the original queries, and keys, and values using learned linear transformations and then apply the attention mechanism to the transformed queries, keys, and values. Each attention layer will generally learn different transformations from each other attention layer in the same attention sub-layer.

In particular, each attention layer is configured to apply a learned query linear transformation to each original query to generate a layer-specific query for each original query, apply a learned key linear transformation to each original key to generate a layer-specific key for each original key, and apply a learned value linear transformation to each original value to generate a layer-specific values for each original value. The attention layer then applies the attention mechanism described above using these layer-specific queries, keys, and values to generate initial outputs for the attention layer.

The attention sub-layer then combines the initial outputs of the attention layers to generate the final output of the attention sub-layer. As shown in FIG. 2, the attention sub-layer concatenates the outputs of the attention layers and applies a learned linear transformation to the concatenated output to generate the output of the attention sub-layer.

In some cases, the learned transformations applied by the attention sub-layer reduce the dimensionality of the original keys and values and, optionally, the queries. For example, when the dimensionality of the original keys, values, and queries is d and there are h attention layers in the sub-layer, the sub-layer may reduce the dimensionality of the original keys, values, and queries to d/h. This keeps the computation cost of the multi-head attention mechanism similar to what the cost would have been to perform the attention mechanism once with full dimensionality while at the same time increasing the representative capacity of the attention sub-layer.

For each decoder self-attention sub-layer, each position in the decoder attends to all positions in the decoder preceding that position. Thus, all of the keys, values, and queries come from the same place, in this case, the output of the previous subnetwork in the decoder, or, for the decoder self-attention sub-layer in the first decoder subnetwork, the embeddings of the combined sequence tokens already generated. Thus, there is a respective key, value, and query for each position in the output order before the current position.

When the decoder self-attention sub-layer implements multi-head attention, each attention layer in the decoder self-attention sub-layer is configured to, at each generation time step, apply a learned query linear transformation to the input at each combined sequence position preceding the corresponding output position to generate a respective query for each combined sequence position, apply a learned key linear transformation to each input at each combined sequence position preceding the corresponding output position to generate a respective key for each output position, apply a learned value linear transformation to each input at each combined sequence position preceding the corresponding output position to generate a respective key for each output position, and then apply the attention mechanism (i.e., the scaled dot-product attention mechanism described above) using the queries, keys, and values to determine an initial decoder self-attention output for each of the output positions. The sub-layer then combines the initial outputs of the attention layers as described above.

In some implementations, to allow the decoder neural network to more effectively process long combined sequences, the attention mechanism is modified by limiting the dot products between Q and K in order to reduce the computational cost of the attention mechanism while maintaining high quality output generation.

Figure 2B:
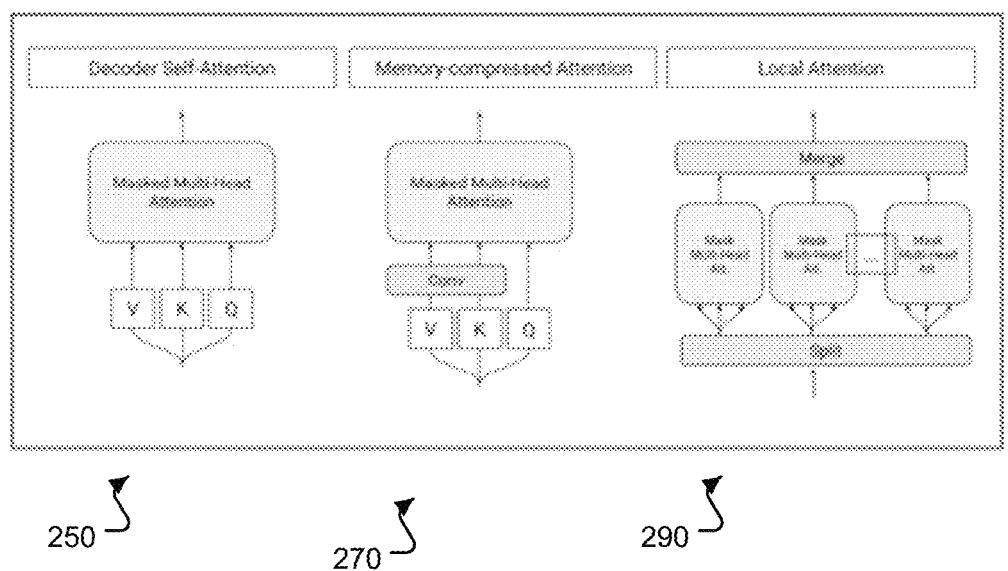
FIG. 2B is a diagram showing attention mechanisms that reduce the computational cost for processing of long sequences.

FIG. 2B is an example diagram showing attention mechanisms that reduce the computational cost for processing of long sequences.

In particular, FIG. 2B shows three different types of attention mechanisms: the masked multi-head attention mechanism 250 described above, memory compressed attention 270, and local attention 290.

As described above, for masked multi-head attention 250, the matrices V, K, and Q are determined and then masked multi-head attention is applied.

In memory compressed attention 270, on the other hand, after the matrices V, K, and Q are determined as described above, the number of keys and values are reduced by applying a strided convolution ("Cony") to the V and K matrices. The number of queries in the Q matrix remains unchanged. This modification divides the number of activations by a compression factor that is based on the size of the kernels and the stride factor of the strided convolution. For example, the convolution kernels may be of size 3 and the stride for the factor for the strided convolution may be 3. Masked multi-head attention is then applied to the reduced V and K matrices as described above.

The memory-compressed attention mechanism 270 is therefore able to exchange information globally on the entire sequence with reduced computational cost relative to the standard multi-head attention mechanism 250 because of the application the strided convolution.

Unlike memory-compressed attention 270 and multi-head attention 250, local attention 290 performs attention independently within each of multiple blocks of the combined sequence. In particular, for local attention, combined sequence tokens are divided into blocks (or "sub-sequences") of similar length and attention is performed in each block independently. As the attention memory cost per block is constant in this scheme, this modification keeps the number of activations linear with respect to the sequence length but does not allow each position to attend to the entire sequence. In more detail, for local attention, the input sequence to the attention mechanism is split into blocks ("split") and multi-head attention is applied independently within each block as described above. The attention outputs for each block are then concatenated ("merge") to generate the output of the local attention mechanism.

As described above, in some implementations, different decoder self-attention sub-layers 132 in different decoder subnetworks 130 employ different attention mechanisms. For example, some self-attention sub-layers can employ local attention while others employ memory-compressed attention. In particular, in some implementations, the type of attention alternates between sub-networks, i.e., with every second, i.e., every other, subnetwork employing memory-compressed attention and the remainder of the subnetworks employing local attention. Having some layers apply memory-compressed attention while others employ local attention allows the decoder neural network to attend over the entire combined sequence even when the combined sequence is very long without consuming an excessive amount of computational resources.

Figure 3:
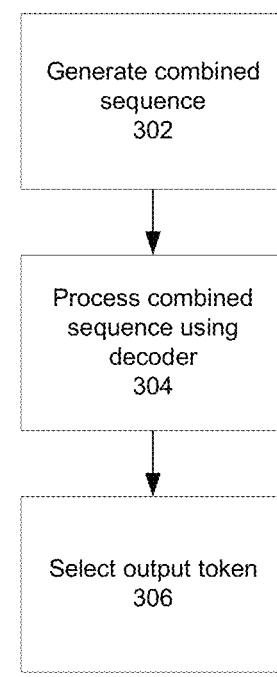
FIG. 3 is a flow diagram of an example process for generating an output sequence from an input sequence.

FIG. 3 is a flow diagram of an example process for generating an output sequence from an input sequence. For convenience, the process 300 will be described as being performed by a system of one or more computers located in one or more locations. For example, a neural network system, e.g., neural network system 100 of FIG. 1, appropriately programmed in accordance with this specification, can perform the process 300.

The system can perform the process 300 at each of multiple generation time steps to generate the output sequence using a self-attention decoder neural network. The decoder neural network is configured to generate the output sequence from the input sequence in an auto-regressive manner. That is, the decoder neural network generates one output from the output sequence at each generation time step. Thus, by performing the process 300 at each of the multiple generation time steps, the system generates all of the output tokens in the output sequence.

The system generates a combined sequence for the generation time step that includes the input sequence followed by the output tokens that have already been generated as of the generation time step (step 310).

The system processes the combined sequence using the self-attention decoder neural network to generate a time step output that defines a score distribution over a set of possible output tokens (step 320).

The system selects, using the time step output, an output token from the set of possible output tokens as the next output token in the output sequence (step 330).

The system can perform the process 300 for an input sequence for which the desired output, i.e., the output sequence that should be generated by the system for the input sequence, is not known. When this is the case, the system performs the process 300 sequentially for all of the generation time steps.

The system can also perform the process 300 on input sequences in a set of training data, i.e., a set of inputs for which the output sequence that should be generated by the system is known, in order to train the decoder to determine trained values for the parameters of the decoder. The process 300 can be performed repeatedly on inputs selected from a set of training data as part of a conventional machine learning training technique to train the initial neural network layers, e.g., a gradient descent with backpropagation training technique that uses a conventional optimizer, e.g., the Adam optimizer. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the sequence transduction neural network in parallel.

However, during training, because the entire ground truth output sequence is available at the beginning of the training process, the system can generate the time step output for each of the generation time steps in parallel, i.e., the system does not need to perform the process 300 sequentially for each generation time step. In other words, the system can provide as input to the decoder neural network a combined sequence that includes the input sequence followed by the entire known output sequence and can generate the time step outputs for all of the generation time steps in parallel. The system can then update, using the machine learning training technique, the decoder parameters to optimize a maximum-likelihood objective that depends on the scores assigned to the correct output tokens at each time step.

Additionally, in some implementations, during training, the system also includes a prediction of the next tokens in the input sequence in the maximum-likelihood objective. In other words, during training, the decoder also generates, for each input position, a score distribution over possible input tokens conditioned on the input tokens at preceding positions in the input sequence. The system then includes the scores assigned to the correct input token at each input position in the maximum-likelihood objective. In so doing, the model is forced to accurately predict the next token in the input as well as the next token in the output and error signals are propagated from both input and output positions during training, improving the performance of the model after it is trained.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations.

Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the adevice, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of training a self-attention decoder neural network for processing an input sequence comprising a plurality of input tokens to generate an output sequence comprising a plurality of output tokens, wherein the self-attention decoder neural network comprises a plurality of neural network layers that include a plurality of masked self-attention neural network layers, the method comprising, for each of a plurality of iterations:

obtaining one or more training examples, wherein each training example comprises a respective training input sequence and a respective training output sequence;

for each respective training example, processing using the self-attention decoder neural network according to current values of parameters of the self-attention decoder neural network, a combined sequence comprising (i) tokens in the respective training input sequence and (ii) tokens in the respective training output sequence to generate a respective prediction output that comprises a respective time step output for each of the tokens in the respective training output sequence; and updating the current values of the parameters of the self-attention decoder neural network based on (i) the respective training output sequences and (ii) the respective prediction outputs.

2. The method of claim 1, wherein the respective time step output defines a score distribution over a set of possible output tokens at a respective time step.

3. The method of claim 2, wherein updating the current values of the parameters of the self-attention decoder neural network comprises optimizing a maximum-likelihood objective that depends on scores assigned to correct output tokens at the respective time steps according to the respective training output sequences.

4. The method of claim 3, wherein, for at least some of the training examples:

the method further comprises using the self-attention decoder neural network to predict next tokens in the respective training input sequences; and the maximum-likelihood objective further depends on scores assigned to correct input tokens according to the respective training input sequences.

5. The method of claim 1, wherein generating the respective prediction output comprises generating the time step outputs for the tokens in the respective training output sequence in parallel.

6. The method of claim 1, wherein the training is performed using a distributed architecture that trains multiple instances of the self-attention decoder neural network in parallel.

7. The method of claim 1, wherein the plurality of masked self-attention neural network layers are masked multi-head attention layers.

8. The method of claim 1, wherein the plurality of masked self-attention neural network layers comprise at least one local attention layer, and wherein each local attention layer comprises a local attention sub-layer that is configured to:

receive a layer input sequence comprising a plurality of layer inputs;

divide the layer input sequence into a plurality of sub-sequences;

generate, for sub-sequence, a sub-sequence output by performing self-attention on the layer inputs in the sub-sequence; and merge the sub-sequence outputs to generate a layer output sequence.

9. The method of claim 1, wherein the plurality of masked self-attention neural network layers comprise at least one memory-compressed attention layer, and wherein each memory-compressed attention layer comprises a memory-compressed sub-layer that is configured to:

obtain an attention input comprising a plurality of keys, values, and queries;

apply a strided convolution to the keys to generate a reduced set of keys;

apply a strided convolution to the values to generate a reduced set of values; and generate a layer output sequence by performing self-attention using the reduced set of keys, the reduced set values, and the plurality of queries.

10. The method of claim 1, wherein the plurality of neural network layers include one or more mixture-of-experts layers.

11. A system comprising one or more computers and one or more storage devices storing instructions that when executed by the one or more computers cause the one or more computers to perform operations for training a self-attention decoder neural network for processing an input sequence comprising a plurality of input tokens to generate an output sequence comprising a plurality of output tokens, wherein the self-attention decoder neural network comprises a plurality of neural network layers that include a plurality of masked self-attention neural network layers, the operations comprising, for each of a plurality of iterations:

obtaining one or more training examples, wherein each training example comprises a respective training input sequence and a respective training output sequence;

for each respective training example, processing using the self-attention decoder neural network according to current values of parameters of the self-attention decoder neural network, a combined sequence comprising (i) tokens in the respective training input sequence and (ii) tokens in the respective training output sequence to generate a respective prediction output that comprises a time step output for each of the tokens in the respective training output sequence; and updating the current values of the parameters of the self-attention decoder neural network based on (i) the respective training output sequences and (ii) the respective prediction outputs.

12. The system of claim 11, wherein the respective time step output defines a score distribution over a set of possible output tokens at a respective time step.

13. The system of claim 12, wherein updating the current values of the parameters of the self-attention decoder neural network comprises optimizing a maximum-likelihood objective that depends on scores assigned to correct output tokens at the respective time steps according to the respective training output sequences.

14. The system of claim 13, wherein, for at least some of the training examples:
- the operations further comprise using the self-attention decoder neural network to predict next tokens in the respective training input sequences; and
- the maximum-likelihood objective further depends on scores assigned to correct input tokens according to the respective training input sequences.

15. The system of claim 11, wherein generating the respective prediction output comprises generating the time step outputs for the tokens in the respective training output sequence in parallel.

16. The system of claim 11, wherein the training is performed using a distributed architecture that trains multiple instances of the self-attention decoder neural network in parallel.

17. One or more non-transitory computer storage media storing instructions that when executed by one or more computers cause the one or more computers to perform operations for training a self-attention decoder neural network for processing an input sequence comprising a plurality of input tokens to generate an output sequence comprising a plurality of output tokens, wherein the self-attention decoder neural network comprises a plurality of neural network layers that include a plurality of masked self-attention neural network layers, the operations comprising, for each of a plurality of iterations:
- obtaining one or more training examples, wherein each training example comprises a respective training input sequence and a respective training output sequence;
- for each respective training example, processing using the self-attention decoder neural network according to current values of parameters of the self-attention decoder neural network, a combined sequence comprising (i) tokens in the respective training input sequence and (ii) tokens in the respective training output sequence to generate a respective prediction output that comprises a time step output for each of the tokens in the respective training output sequence; and
- updating the current values of the parameters of the self-attention decoder neural network based on (i) the respective training output sequences and (ii) the respective prediction outputs.

18. The one or more non-transitory computer storage media of claim 17, wherein the respective time step output defines a score distribution over a set of possible output tokens at a respective time step.

19. The one or more non-transitory computer storage media of claim 18, wherein updating the current values of the parameters of the self-attention decoder neural network comprises optimizing a maximum-likelihood objective that depends on scores assigned to correct output tokens at the respective time steps according to the respective training output sequences.

20. The one or more non-transitory computer storage media of claim 19, wherein, for at least some of the training examples:
- the operations further comprise using the self-attention decoder neural network to predict next tokens in the respective training input sequences; and
- the maximum-likelihood objective further depends on scores assigned to correct input tokens according to the respective training input sequences.

* * * * *